(12) United States Patent
Chuang (10) Patent No.: US 6,384,972 B1
(45) Date of Patent: May 7, 2002

(54) PROJECTION DISPLAY WITH THREE POLARIZATION BEAM SPLITTER PRISMS

(75) Inventor: Fu-Ming Chuang, Hsin-Chu Hsien (TW)

(73) Assignee: Prokia Technology Co., Ltd. (TW)

( * ) Notice: Subject to any disclaimer, the term of this patent is extended or adjusted under 35 U.S.C. 154(b) by 0 days.

(21) Appl. No.: 09/881,303

(22) Filed: Jun. 13, 2001

(51) Int. Cl.[7] .............................. G02B 5/30; G02F 1/00; G03B 21/00
(52) U.S. Cl. ..................... 359/495; 359/497; 359/487; 359/634; 359/247; 359/250; 359/256; 353/20; 353/31; 349/5; 348/756
(58) Field of Search ................... 359/246, 247, 359/250, 256, 259, 263, 487, 495, 496, 497, 634; 348/742, 756, 757; 349/5, 8, 9; 353/20, 31, 33

(56) References Cited

U.S. PATENT DOCUMENTS

| | | | | |
|---|---|---|---|---|
| 5,374,968 A | * | 12/1994 | Haven et al. | 353/31 |
| 5,575,548 A | * | 11/1996 | Lee | 353/31 |
| 5,826,959 A | * | 10/1998 | Atsuchi | 353/20 |
| 6,067,128 A | * | 5/2000 | Imai | 349/8 |
| 6,113,239 A | * | 9/2000 | Sampsell et al. | 349/9 |
| 6,176,586 B1 | * | 1/2001 | Hirose et al. | 353/20 |
| 6,183,090 B1 | * | 2/2001 | Nakanishi et al. | 353/20 |
| 6,183,091 B1 | * | 2/2001 | Johnson et al. | 353/20 |
| 6,247,814 B1 | * | 6/2001 | Lin | 353/33 |
| 6,247,816 B1 | * | 6/2001 | Cipolla et al. | 353/31 |
| 6,280,034 B1 | * | 8/2001 | Brennesholtz | 348/742 |
| 6,309,071 B1 | * | 10/2001 | Huang et al. | 353/31 |
| 2001/0040669 A1 | * | 11/2001 | Aoto et al. | 353/20 |

FOREIGN PATENT DOCUMENTS

JP  2000-284228  * 10/2000

* cited by examiner

Primary Examiner—Ricky D. Shafer
(74) Attorney, Agent, or Firm—Trop, Pruner & Hu, P.C.

(57) ABSTRACT

A projection display is used to process a light beam that includes first, second and third color components and that is to be provided to a projection lens. The projection display includes a dichroic beam splitter which separates the first color component from the second and third color components. A first polarization beam splitter prism cooperates with a first reflective light valve to process the first color component. A second polarization beam splitter prism cooperates with second and third reflective light valves to process the second and third color components. A third polarization beam splitter prism is disposed so as to direct the processed color components from the first and second polarization beam splitter prisms to the projection lens.

5 Claims, 11 Drawing Sheets

FIG. 11

PROJECTION DISPLAY WITH THREE POLARIZATION BEAM SPLITTER PRISMS

BACKGROUND OF THE INVENTION

1. Field of the Invention

The invention relates to a projection display, more particularly to one that includes three polarization beam splitter prisms.

2. Description of the Related Art

Figure 1:
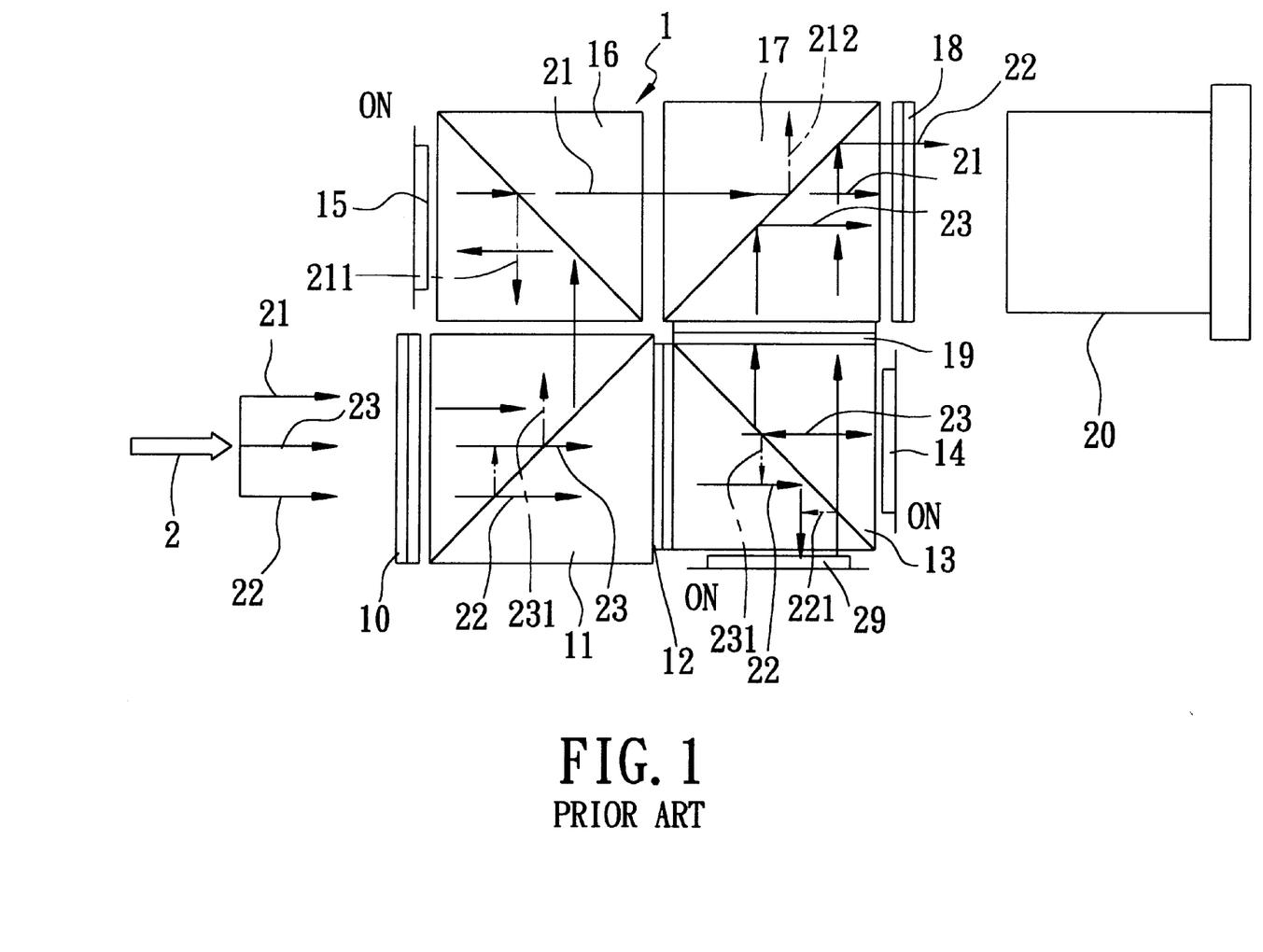
FIG. 1 is a schematic view of a conventional projection display to illustrate paths of different color components of a light beam when reflective light valves of the projection display are in an active (ON) state.

In a conventional projection display, beam splitter prisms are employed to separate a light beam into red, blue and green primary color components to facilitate independent control of the characteristics of the latter and to achieve the effect of optimum contrast. FIG. 1 illustrates a conventional projection display 1 that incorporates four polarization beam splitter prisms. In the conventional projection display 1, a P-polarization light beam 2 is processed before providing the same to a projection lens 20. The projection lens 20 has an optical axis that is parallel to an input axis of the light beam 2. The light beam 2 includes a first (green) color component 21, a second (blue) color component 22, and a third (red) color component 23.

In order to achieve independent control of the color components 21, 22, 23, the components of the conventional projection display 1 are generally arranged into first and second rows. The first row is aligned with the input axis of the light beam 2. The second row is aligned with the optical axis of the projection lens 20. The components in the first row, in an order from left to right and with the light beam 2 coming from the left, include a first light polarization selector 10, a first polarization beam splitter prism 11, a second light polarization selector 12, a second polarization beam splitter prism 13, and a first reflective light valve 14. The components in the second row, in an order from left to right and with the projection lens 20 disposed at the right, include a second reflective light valve 15, a third polarization beam splitter prism 16, a fourth polarization beam splitter prism 17, and a third light polarization selector 18. A fourth light polarization selector 19 is disposed between the second and fourth polarization beam splitter prisms 13, 17. A third reflective light valve 29 is disposed on one side of the second polarization beam splitter prism 13 opposite to the fourth light polarization selector 19.

The operation of the conventional projection display 1 when the first, second and third reflective light valves 14, 15, 29 are in an active (ON) state is as follows: When the P-polarization light beam 2 passes through the first light polarization selector 10, the polarization state of the first color component 21 will be changed from P-polarization to S-polarization. Thereafter, the S-polarization first color component 21 will be reflected by the first polarization beam splitter prism 11 toward the third polarization beam splitter prism 16, and will be further reflected by the third polarization beam splitter prism 16 toward the second reflective lightvalve 15. Because the second reflective light valve 15 is in the active (ON) state, the polarization state of the first color component 21 will be changed from S-polarization to P-polarization, and the P-polarization first color component 21 will be reflected back to the third polarization beam splitter prism 16. The P-polarization first color component 21 then passes through the third polarization beam splitter prism 16, the fourth polarization beam splitter prism 17, and the third light polarization selector 18 such that the polarization state of the first color component 21 is changed to S-polarization prior to reaching the projection lens 20.

As the P-polarization first color component 21 passes through the third and fourth polarization beam splitter prisms 16, 17, about 10% thereof will form polarized light leakage components 211, 212. However, the polarized light leakage components 211, 212 have reflected paths that are transverse to the optical axis of the projection lens 20 and therefore do not reach the projection lens 20. As such, when the second reflective light valve 15 is in the active (ON) state, the polarized light leakage components 211, 212 that are attributed to the first color component 21 will not be projected by the projection lens 20 so as not to affect the output image quality.

After the P-polarization second and third color components 22, 23 pass through the first light polarization selector 10, they will be allowed to pass directly through the first polarization beam splitter prism 11 so as to reach the second light polarization selector 12. As the P-polarization second color component 22 passes through the second light polarization selector 12, the polarization state thereof will change from P-polarization to S-polarization. Thereafter, the S-polarization second color component 22 will be reflected by the second polarization beam splitter prism 13 toward the third reflective light valve 29. Because the third reflective light valve 29 is in the active (ON) state, the polarization state of the second color component 22 will be changed from S-polarization to P-polarization, and the P-polarization second color component 22 will be reflected back to the second polarization beam splitter prism 13. The P-polarization second color component 22 then passes through the second polarization beam splitter prism 13 so as to reach the fourth light polarization selector 19. As the P-polarization second color component 22 passes through the fourth light polarization selector 19, the polarization state thereof will change from P-polarization to S-polarization prior to reaching the fourth polarization beam splitter prism 17. The fourth polarization beam splitter prism 17 reflects the S-polarization second color component 22 to enable the latter to pass through the third light polarization selector 18 and reach the projection lens 20.

As the P-polarization second color component 22 passes through the second polarization beam splitter prism 13, a polarized light leakage component 221 will be formed. However, since the polarized light leakage component 221 is reflected by the second polarization beam splitter prism 13 so as not to reach the projection lens 20, the output image quality will not be affected thereby.

The P-polarization third color component 23 from the first light polarization selector 10 will be allowed to pass through the first polarization beam splitter prism 11, the second light polarization selector 12 and the second polarization beam splitter prism 13 so as to reach the first reflective light valve 14. Because the first reflective light valve 14 is in the active (ON) state, the polarization state of the third color component 23 will be changed from P-polarization to S-polarization, and the S-polarization third color component 23 will be reflected back to the second polarization beam splitter prism 13. The S-polarization third color component 23 is then reflected by the second polarization beam splitter prism 13 so as to pass through the fourth light polarization selector 19 and reach the fourth polarization beam splitter prism 17. The fourth polarization beam splitter prism 17 reflects the S-polarization third color component 23 to pass through the third light polarization selector 18 prior to reaching the projection lens 20.

As the P-polarization third color component 23 passes through the first and second polarization beam splitter prisms 11, 13, polarized light leakage components 231 will be formed. However, since the polarized light leakage components 231 are reflected so as not to reach the projection lens 20, the output image quality of the conventional projection display 1 will not be affected thereby.

Figure 2:
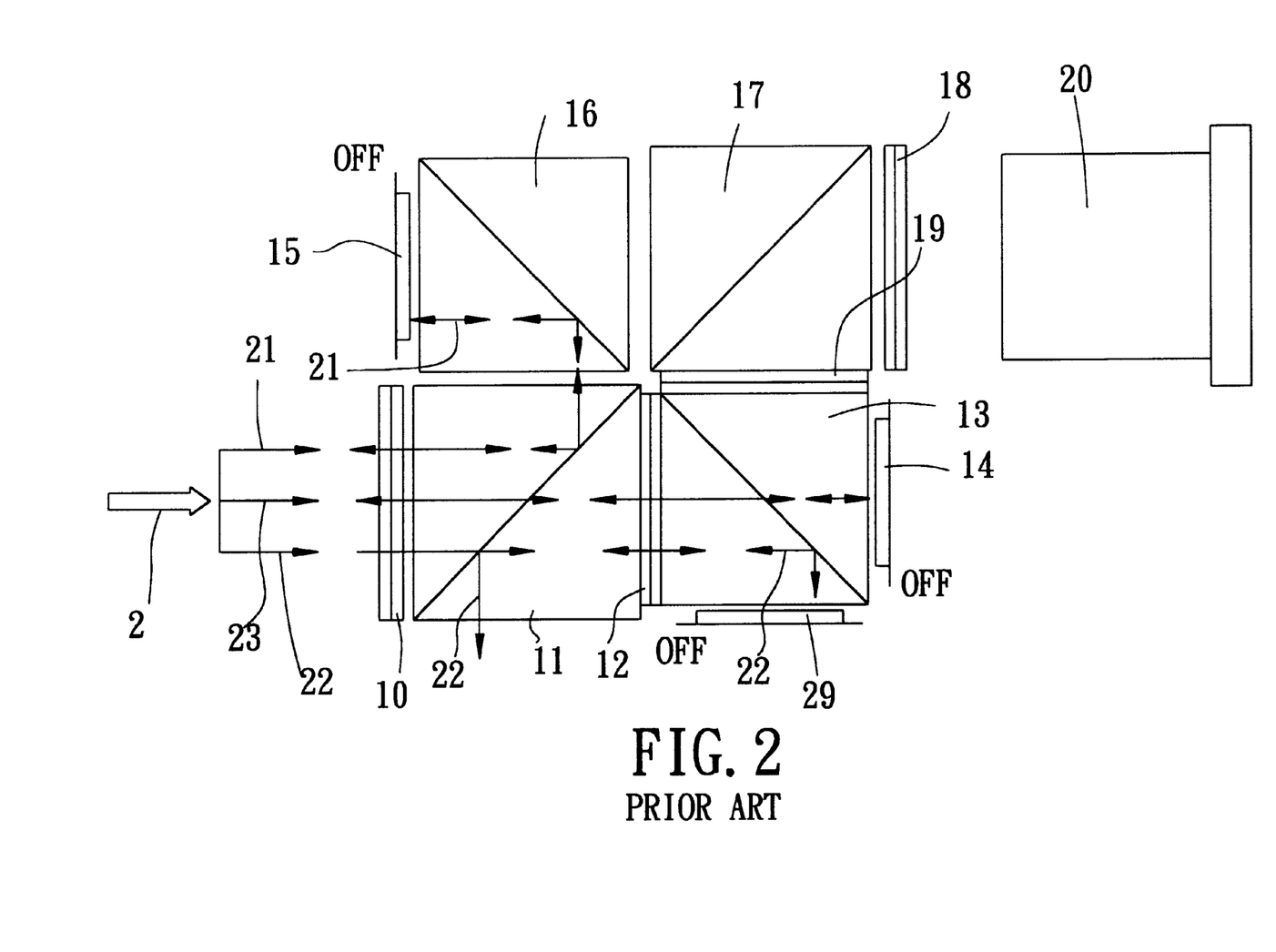
FIG. 2 is a schematic view of the conventional projection display to illustrate paths of the different color components of the light beam when the reflective light valves of the projection display are in an inactive (OFF) state.

Referring to FIG. 2, the paths of the color components 21, 22, 23 of the light beam 2 when the first, second and third reflective light valves 14, 15, 29 of the conventional projection display 1 are in an inactive (OFF) state are as follows:

1. The P-polarization first color component 21 will pass through the first light polarization selector 10 such that the polarization state thereof will be changed to S-polarization. The S-polarization first color component 21 will then be reflected by the first polarization beam splitter prism 11 toward the third polarization beam splitter prism 16, and will be further reflected by the third polarization beam splitter prism 16 toward the second reflective light valve 15. The second reflective light valve 15 will reflect the S-polarization first color component 21 back to the third polarization beam splitter prism 16, and the third polarization beam splitter prism 16 will reflect the S-polarization first color component 21 back to the first polarization beam splitter prism 11. The S-polarization first color component 21 will then be reflected by the first polarization beam splitter prism 11 to pass through the first light polarization selector 10.

2. The P-polarization second color component 22 will pass in sequence through the first light polarization selector 10, the first polarization beam splitter prism 11, and the second light polarization selector 12. When the P-polarization second color component 22 passes through the second light polarization selector 12, the polarization state of the second color component 22 will change from P-polarization to S-polarization. Thereafter, the S-polarization second color component 22 will be reflected by the second polarization beam splitter prism 13 toward the third reflective light valve 29. The S-polarization second color component 22 will be reflected by the third reflective light valve 29 back to the second polarization beam splitter prism 13, which in turn reflects the S-polarization second color component 22 to enable the latter to pass through the second light polarization selector 12 and reach the first polarization beam splitter prism 11. Finally, the first polarization beam splitter prism 11 reflects the S-polarization color component 22 away from the projection lens 20.

3. The P-polarization third color component 23 will pass in sequence through the first light polarization selector 10, the first polarization beam splitter prism 11, the second light polarization selector 12, and the second polarization beam splitter prism 13 so as to reach the first reflective light valve 14. The first reflective light valve 14 then reflects the P-polarization third color component 23 so as to pass in sequence through the second polarization beam splitter prism 13, the second light polarization selector 12, the first polarization beam splitter prism 11 and the first light polarization selector 10.

It has thus been shown that the four polarization beam splitter prisms 11, 13, 16, 17 and the four light polarization selectors 10, 12,18, 19 of the conventional projection display 1 cooperate to prevent light leakage components from reaching the projection lens 20 regardless of the operating states of the reflective light valves 14, 15, 29, thereby ensuring optimum image contrast quality. However, the use of four polarization beam splitter prisms 11, 13, 16, 17 results in higher costs, and in a bulky and heavy construction.

SUMMARY OF THE INVENTION

Therefore, the object of the present invention is to provide a projection display that utilizes three polarization beam splitter prisms to result in lower costs and in a compact and lighter construction without adversely affecting the image contrast quality.

According to the present invention, a projection display is used to process a light beam that is to be provided to a projection lens and that includes first, second and third color components. The projection display comprises a dichroic beam splitter prism, a first polarization beam splitter prism, a second polarization beam splitter prism, a third polarization beam splitter prism, a first light polarization selector, a second light polarization selector, a third light polarization selector, a first reflective light valve, a second reflective light valve, and a third reflective light valve.

The dichroic beam splitter is adapted to separate the first color component from the second and third color components.

The first polarization beam splitter prism is disposed adjacent to the dichroic beam splitter so as to receive the first color component therefrom.

The second polarization beam splitter prism is disposed adjacent to the dichroic beam splitter so as to receive the second and third color components therefrom.

The third polarization beam splitter prism is disposed adjacent to the first and second polarization beam splitter prisms.

The first reflective light valve is disposed adjacent to the first polarization beam splitter prism so as to receive the first color component therefrom. The first reflective light valve processes the first color component from the first polarization beam splitter prism by changing the polarization state of the first color component when in an active state, and reflects the first color component back to the first polarization beam splitter prism. The first polarization beam splitter prism provides the first color component processed by the first reflective light valve to the third polarization beam splitter prism.

The first light polarization selector is disposed between the dichroic beam splitter and the second polarization beam splitter prism for changing the polarization state of one of the second and third color components so as to enable the second polarization beam splitter prism to separate the second color component from the third color component.

The second reflective light valve is disposed adjacent to the second polarization beam splitter prism so as to receive the second color component therefrom. The second reflective light valve processes the second color component from the second polarization beam splitter prism by changing the polarization state of the second color component when in an active state, and reflects the second color component back to the second polarization beam splitter prism. The second polarization beam splitter prism provides the second color component processed by the second reflective light valve to the third polarization beam splitter prism.

The third reflective light valve is disposed adjacent to the second polarization beam splitter prism so as to receive the third color component therefrom. The third reflective light valve processes the third color component from the second polarization beam splitter prism by changing the polarization state of the third color component when in an active state, and reflects the third color component back to the second polarization beam splitter prism. The second polarization beam splitter prism provides the third color component processed by the third reflective light valve to the third polarization beam splitter prism.

The second light polarization selector is disposed between the second and third polarization beam splitter prisms for changing the polarization state of one of the second and third color components that passes from the second polarization beam splitter prism to the third polarization beam splitter prism.

The third polarization beam splitter prism is further disposed so as to direct the first, second and third color components received from the first and second polarization beam splitter prisms to the projection lens.

The third light polarization selector is to be disposed between the third polarization beam splitter prism and the projection lens. The third light polarization selector ensures that the first, second and third color components from the third polarization beam splitter prism have the same polarization state prior to reaching the projection lens.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Before the present invention is described in greater detail, it should be noted that like elements are denoted by the same reference numerals throughout the disclosure.

Figure 3:
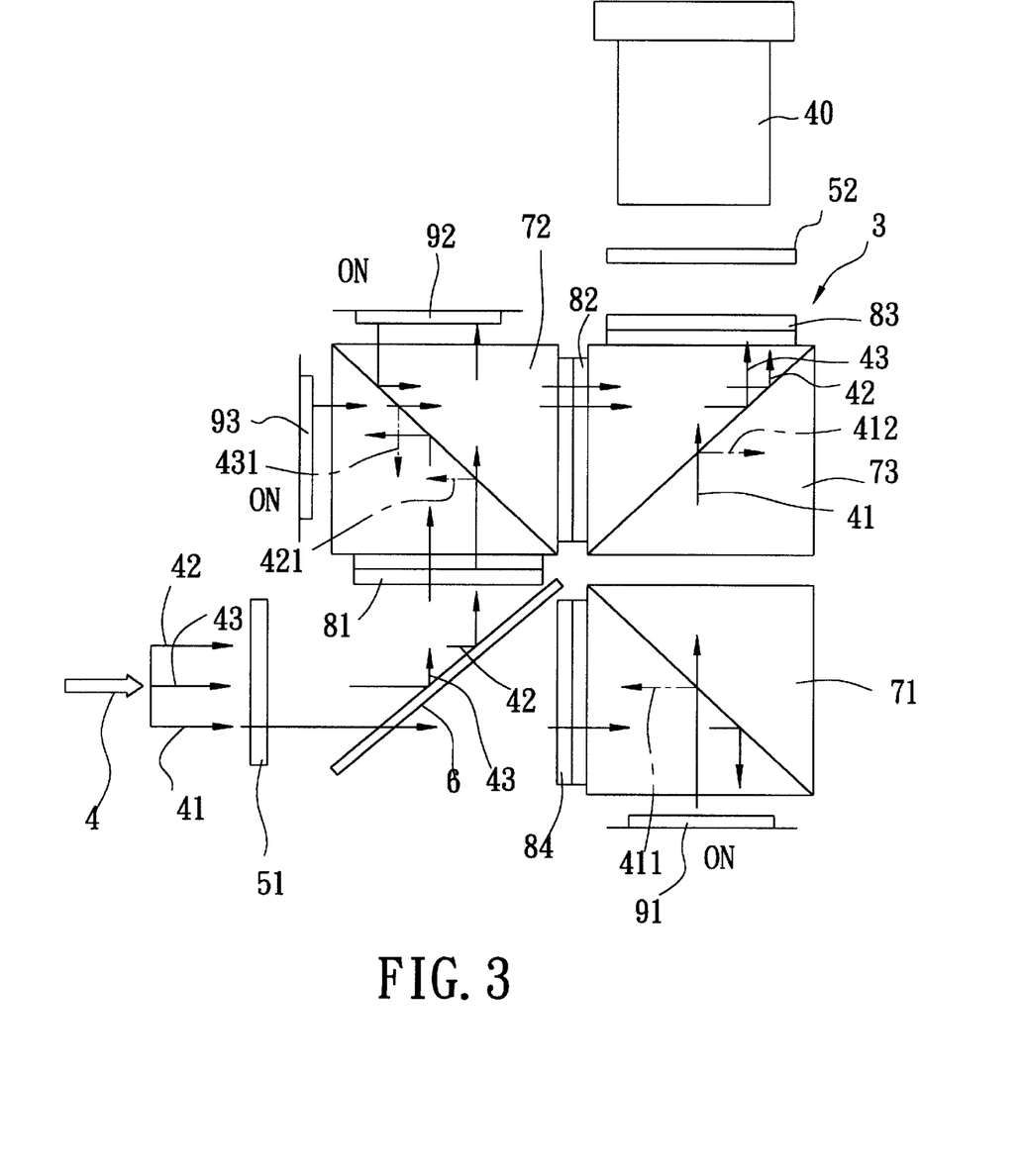
FIG. 3 is a schematic view of the first preferred embodiment of a projection display according to the present invention to illustrate paths of different color components of a light beam when reflective light valves of the projection display are in an active (ON) state.

Referring to FIG. 3, the first preferred embodiment of a projection display 3 according to the present invention is adapted to process an S-polarization light beam 4 before providing the same to a projection lens 40. The light beam 4 includes first, second and third color components 41, 42, 43. In this embodiment, the light beam 4 has an input axis that is transverse to an optical axis of the projection lens 40. The projection display 3 comprises two polarizers 51, 52, a dichroic beam splitter 6, a first polarization beam splitter prism 71, a second polarization beam splitter prism 72, a third polarization beam splitter prism 73, a first light polarization selector 81, a second light polarization selector 82, a third light polarization selector 83, a fourth light polarization selector 84, a first reflective light valve 91, a second reflective light valve 92, and a third reflective light valve 93.

Each of the polarizers 51, 52 is adapted to filter P-polarization light and to allow only S-polarization light to pass therethrough. The polarizer 51 is disposed adjacent to an input side of the dichroic beam splitter 6 to allow only S-polarization light to pass there through. The polarizer 52 is disposed between the third light polarization selector 83 and the projection lens 40 to allow only S-polarization light to reach the projection lens 40.

The dichroic beam splitter 6 is disposed in front of the polarizer 51 relative to the entry path of the light beam 4. The dichroic beam splitter 6 allows the first color component 41 to pass therethrough so as to travel along a first path that is transverse to the optical axis of the projection lens 40, and reflects the second and third color components 42, 43 so as to travel along a second path that is parallel to the optical axis of the projection lens 40.

Each of the polarization beam splitter prisms 71, 72, 73 allows P-polarization light to pass therethrough, and reflects S-polarization light by an angle of about 90 degrees so as to travel in a transverse direction. The first polarization beam splitter prism 71 is disposed in front of the dichroic beam splitter 6 relative to the path of the first color component 41. The second polarization beam splitter prism 72 is disposed in front of the dichoric beam splitter 6 relative to the path of the second and third color components 42, 43. The first and second polarization beam splitter prisms 71, 72 are thus diagonally opposite relative to each other. The third polarization beam splitter prism 73 is disposed adjacent to the first and second polarization beam splitter prisms 71, 72 and is diagonally opposite to the dichroic beam splitter 6. The first and third polarization beam splitter prisms 71, 73 are aligned along the optical axis of the projection lens 40. The second and third polarization beam splitter prisms 72, 73 are aligned along an axis that is transverse to the optical axis of the projection lens 40.

Each of the light polarization selectors 81, 82, 83, 84 is used to change the polarization state of a selected one of the color components 41, 42, 43. The first light polarization selector 81 is disposed between the second polarization beam splitter prism 72 and the dichroic beam splitter 6, and serves to change the polarization state of the second color component 42 from S-polarization to P-polarization. The second light polarization selector 82 is disposed between the second and third polarization beam splitter prisms 72, 73, and serves to change the polarization state of the third color component 43 to S-polarization so that the third color component 43 can be reflected to reach the projection lens 40. The third light polarization selector 83 is disposed between the third polarization beam splitter prism 73 and the polarizer 52, and serves to change the polarization state of the first color component 41 to S-polarization before the latter reaches the projection lens 40. The fourth light polarization selector 84 is disposed between the dichroic beam splitter 6 and the first polarization beam splitter prism 71, and is used primarily to convert the polarization states of the second and third color components 42, 43.

In actual practice, the fourth light polarization selector 84 is not an essential component of the projection display 3 of the present embodiment. However, since the dichroic beam splitter 6 is unable to reflect all of the second and third color components 42, 43, roughly 3% of the second and third color components 42, 43 will reach the first polarization beam splitter prism 71. Due to the presence of the fourth light polarization selector 84, the second and third color components 42, 43 that reach the first polarization beam splitter prism 71 will have the polarization state thereof changed to the P-polarization state, thereby enabling the first polarization beam splitter prism 71 to direct the same away from the first reflective light valve 91 so as to achieve optimum output image quality.

Each of the reflective light valves 91, 92, 93 is operable so as to change or maintain the polarization state of a corresponding one of the color components 41, 42, 43. Particularly, when the reflective light valves 91, 92, 93 are in an active (ON) state, the polarization state of the corresponding one of the color components 41, 42, 43 will be changed, and when the reflective light valves 91, 92, 93 are in an inactive (OFF) state, the polarization state of the corresponding one of the color components 41, 42,43 will be maintained. The first reflective light valve 91 is disposed adjacent to the first polarization beam splitter prism 71 and is used to control the first color component 41. The second and third reflective light valves 92, 93 are disposed adjacent to two sides of the second polarization beam splitter prism 72, and are used to control the second and third color components 42, 43, respectively.

The operation of the projection display 3 when the reflective light valves 91, 92, 93 are in the active (ON) state is as follows: When the S-polarization light beam 4 passes through the polarizer 51, impure P-polarized components of the light beam 4 will be filtered, and only pure S-polarization light will be allowed to reach the dichroic beam splitter 6. The S-polarization first color component 41 of the light beam 4 will pass through the dichroic beam splitter 6 and the fourth light polarization selector 84, and will be reflected by the first polarization beam splitter prism 71 toward the first reflective light valve 91. Since the first reflective light valve 91 is in the active (ON) state, the polarization state of the first color component 41 will be changed from S-polarization to P-polarization, and the P-polarization first color component 41 will be reflected back to the first polarization beam splitter prism 71. The P-polarization first color component 41 then passes through the first and third polarization beam splitter prisms 71, 73 before reaching the third light polarization selector 83. The third light polarization selector 83 changes the polarization state of the first color component 41 to S-polarization as the latter passes therethrough. Finally, the S-polarization first color component 41 passes through the polarizer 52 before reaching the projection lens 40.

As the P-polarization first color component 41 passes through the first and third polarization beam splitter prisms 71, 73 after being reflected by the first reflective light valve 91, first and second polarized light leakage components 411, 412 will be formed. However, the first and second polarized light leakage components 411, 412 have reflected paths that are transverse to the optical axis of the projection lens 40 and therefore do not reach the projection lens 40. As such, the output image contrast quality will not be affected by the first and second polarized light leakage components 411, 412.

When the S-polarization second and third color components 42, 43 of the light beam 4 reach the dichroic beam splitter 6, they will be reflected toward the first light polarization selector 81 so as to reach the second polarization beam splitter prism 72. As the second color component 42 passes through the first light polarization selector 81, the polarization state thereof will be changed from S-polarization to P-polarization. The P-polarization second color component 42 will pass through the second polarization beam splitter prism 72 so as to reach the second reflective light valve 92. Since the second reflective light valve 92 is in the active (ON) state, the polarization state of the second color component 42 will be changed from P-polarization to S-polarization, and the S-polarization second color component 42 will be reflected back to the second polarization beam splitter prism 72. The S-polarization second color component 42 is then reflected by the second polarization beam splitter 72 toward the third polarization beam splitter prism 73. The third polarization beam splitter prism 73 subsequently reflects the S-polarization second color component 42 to pass through the third light polarization selector 83 and the polarizer 52 before reaching the projection lens 40.

When the second reflective light valve 92 is in the active (ON) state, as the P-polarization second color component 42 passes through the second polarization beam splitter prism 72, a third polarized light leakage component 421 will be formed. The third polarized light leakage component 421 will be reflected by the second polarization beam splitter prism 72 toward the third reflective light valve 93, where the polarization state of the third polarized light leakage component 421 is changed to S-polarization. The S-polarization third polarized light leakage component 421 will be reflected by the third reflective light valve 93 back to the second polarization beam splitter prism 72, and will be further reflected by the second polarization beam splitter prism 72 toward the dichroic beam splitter 6. As such, the quality of the image projected by the projection lens 40 will not be affected by the third polarized light leakage component 421.

When the S-polarization third color component 43 from the dichroic beam splitter 6 passes through the first light polarization selector 81 and reaches the second polarization beam splitter prism 72, the S-polarization third color component 43 will be reflected by the second polarization beam splitter prism 72 toward the third reflective light valve 93. Since the third reflective light valve 93 is in the active (ON) state, the polarization state of the third color component 43 will be changed from S-polarization to P-polarization, and the P-polarization third color component 43 will be reflected back to the second polarization beam splitter prism 72. The P-polarization third color component 43 then passes through the second polarization beam splitter 72 and the second light polarization selector 82. As the third color component passes through the second light polarization selector 82 so as to reach the third polarization beam splitter prism 73, the polarization state thereof will be changed from P-polarization to S-polarization. The third polarization beam splitter prism 73 subsequently reflects the S-polarization third color component 43 to pass through the third light polarization selector 83 and the polarizer 52 before reaching the projection lens 40.

As the P-polarization third color component 43 passes through the second polarization beam splitter prism 72, a fourth polarized light leakage component 431 will be formed. The fourth polarized light leakage component 431 will be reflected by the second polarization beam splitter prism 72 toward the dichroic beam splitter prism 6 so as not to reach the projection lens 40.

Figure 4:
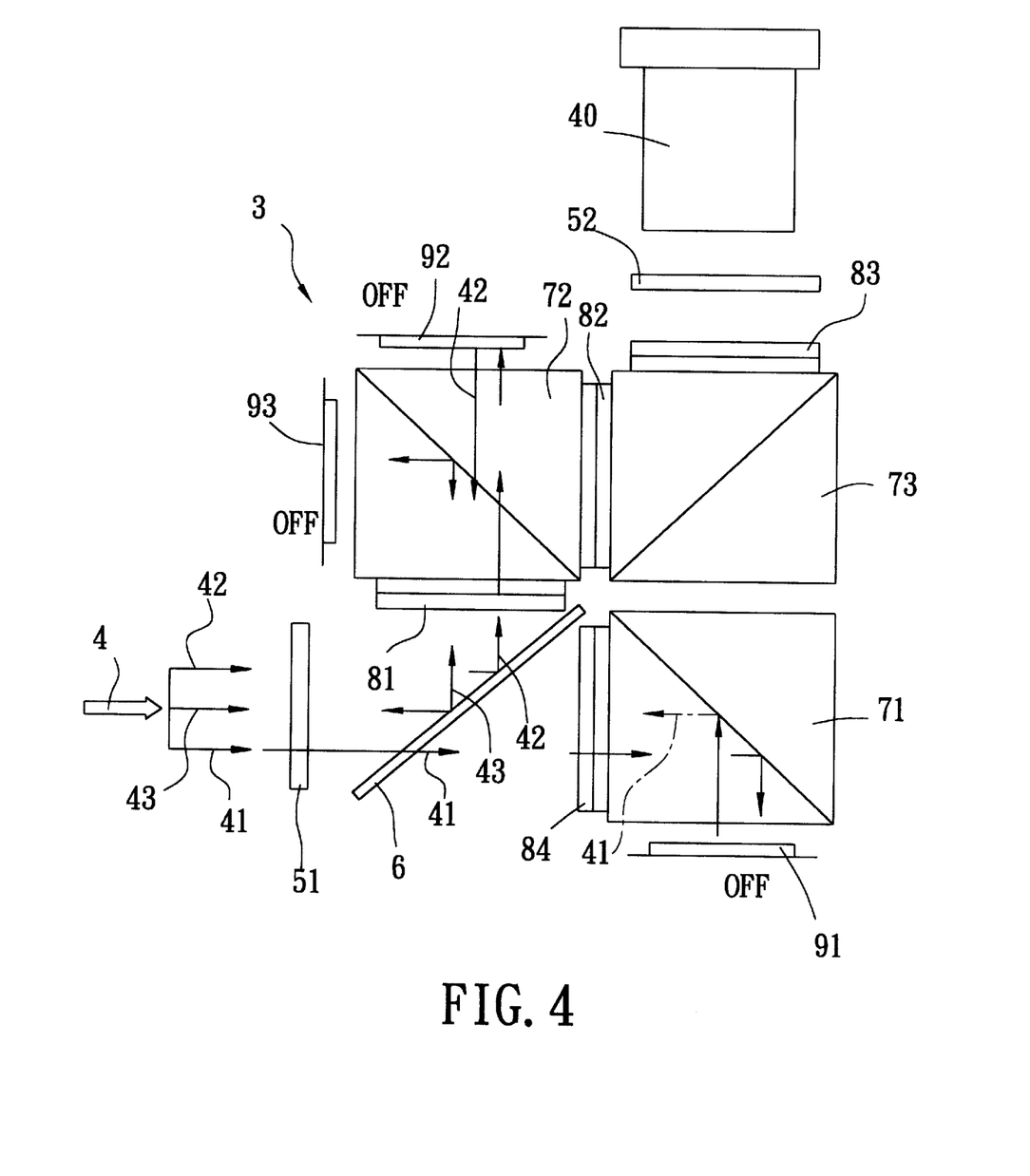
FIG. 4 is a schematic view of the first preferred embodiment to illustrate paths of the different color components of the light beam when the reflective light valves of the projection display are in an inactive (OFF) state.

Referring to FIG. 4, the paths of the color components 41, 42, 43 of the light beam 4 when the first, second and third reflective light valves 91, 92, 93 of the projection display 3 are in an inactive (OFF) state are as follows:

1. The S-polarization first color component 41 will pass through the polarizer 51, the dichroic beam splitter 6, and the fourth light polarization selector 84 before being reflected by the first polarization beam splitter prism 71 toward the first reflective light valve 91. Because the first reflective light valve 91 is in the inactive (OFF) state, the S-polarization first color component 41 is reflected back to the first polarization beam splitter 71, and is further reflected by the first polarization beam splitter prism 71 to pass through the fourth light polarization selector 84. As such, the S-polarization first color component 41 will be prevented from reaching the projection lens 40.

2. The S-polarization second color component 42 will pass through the polarizer 51 and will be reflected by the dichroic beam splitter 6 toward the first light polarization selector 81. The polarization state of the second color component 42 will be changed from S-polarization to P-polarization as it passes through the first light polarization selector 81 before reaching the second polarization beam splitter prism 72. The P-polarization second color component 42 will pass through the second polarization beam splitter prism 72 so as to reach the second reflective light valve 92, and will be reflected by the second reflective light valve 92 so as to pass through the second polarization beam splitter prism 72 in a direction away from the projection lens 40.

3. The S-polarization third color component 43 will pass through the polarizer 51 and will be reflected by the dichroic beam splitter 6 toward the first light polarization selector 81 and the second polarization beam splitter prism 72. The S-polarization third color component 43 will then be reflected by the second polarization beam splitter prism 72 toward the third reflective lightvalve 93, and will be further reflected by the third reflective light valve 93 back to the second polarization beam splitter prism 72. The second polarization beam splitter prism 72 then reflects the S-polarization third color component 43 to travel in a direction away from the projection lens 40.

In actual practice, the reflective light valves 91, 92, 93 are independently controlled, and are not in the active (ON) state or in the inactive (OFF) state at the same time.

It has thus been shown that, in the projection display 3 of FIG. 3, the polarized light leakage components 411, 412, 421, 431 that are formed when the reflective light valves 91, 92, 93 are in the active (ON) state can be prevented from reaching the projection lens 40 so as not to affect the output image quality. In addition, the three color components 41, 42, 43 are also prevented from reaching the projection lens 40 when the reflective light valves 91, 92, 93 are in the inactive (OFF) state. As such, optimum contrast can be ensured in the projection display 3 of this invention.

In the embodiment of FIGS. 3 and 4, the light beam 4 that is processed by the projection display 3 has S-polarization. It should be apparent to one skilled in the art that, by varying the light polarization characteristics of the various light polarization selectors, the projection display of this invention can be configured so as to process a P-polarization light beam in a manner similar to that described hereinabove.

Figure 5:
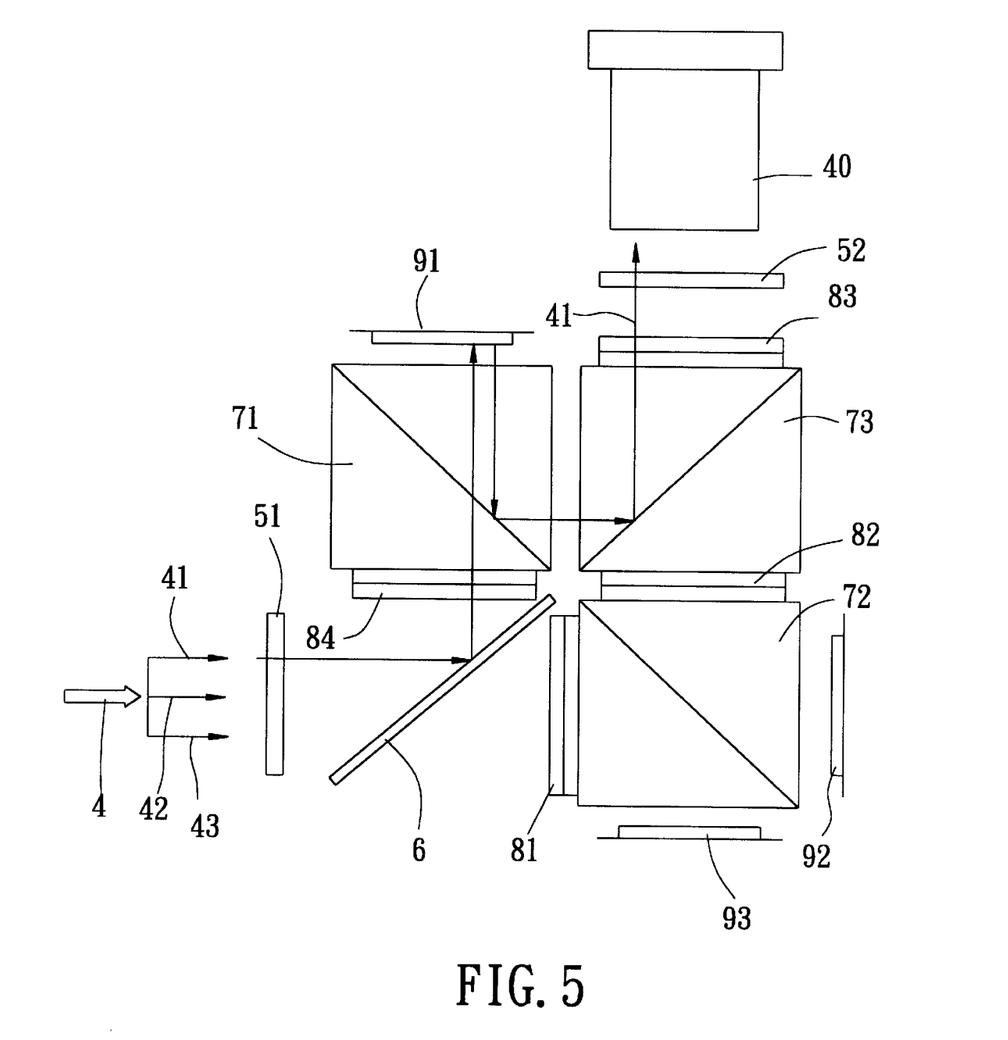
FIG. 5 is a schematic view of the second preferred embodiment of a projection display according to the present invention.

FIG. 5 illustrates the second preferred embodiment of a projection display according to the present invention. As compared to the embodiment of FIG. 3, the positions of the first and second polarization beam splitter prisms 71, 72 are interchanged, and the positions of the second and third reflective light valves 92, 93 on the second polarization beam splitter prism 72 and that of the first reflective light valve 91 on the first polarization beam splitter prism 71 are adjusted as well. In this embodiment, the dichroic beam splitter 6 is configured so as to allow the second and third color components 42, 43 to pass therethrough, and so as to reflect the first color component 41 toward the first polarization beam splitter prism 71. The above-described effect that is achieved in the previous embodiment can be similarly accomplished in the present embodiment. The present embodiment can be configured to process S-polarization or P-polarization light beam 4.

Figure 6:
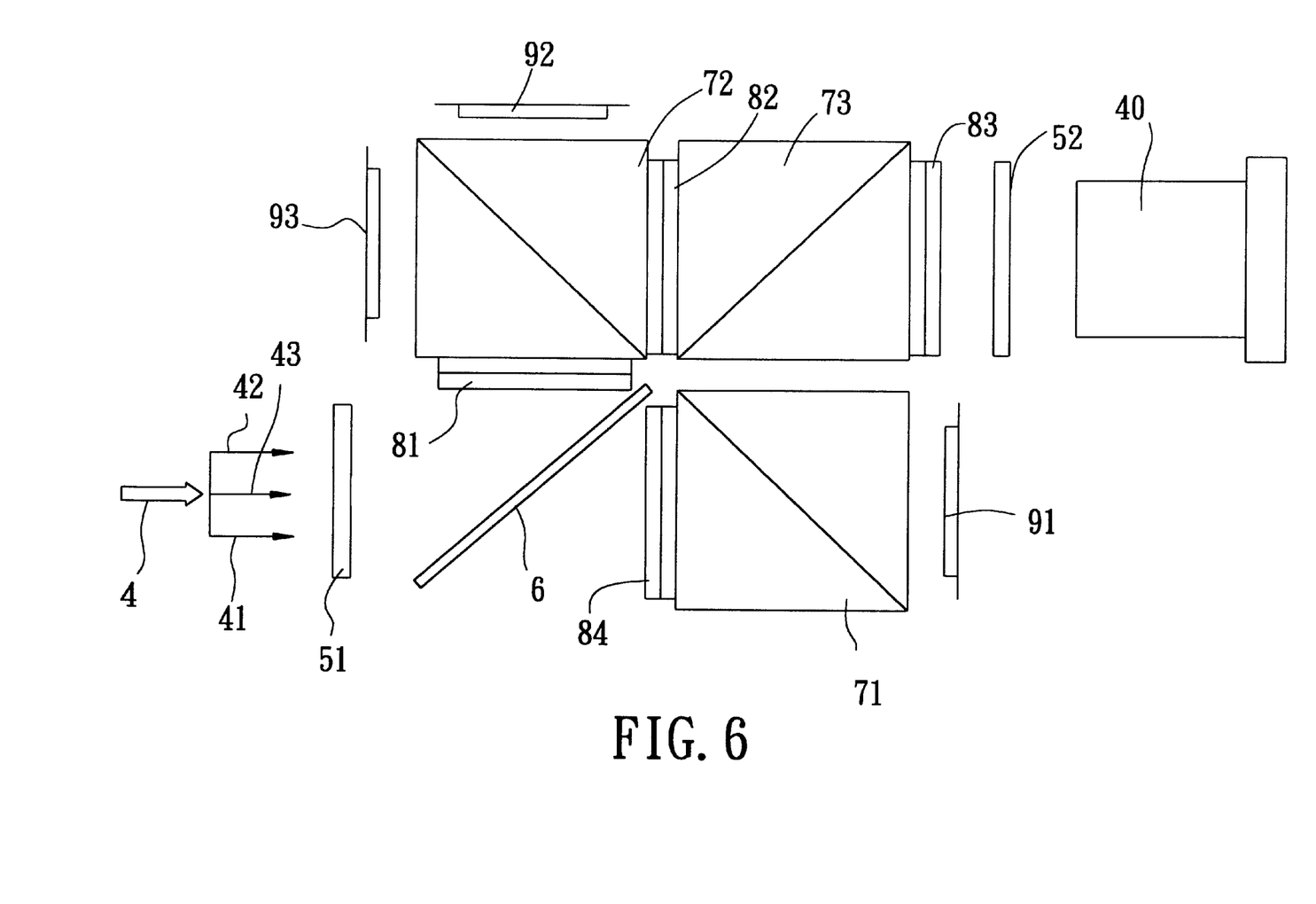
FIG. 6 is a schematic view of the third preferred embodiment of a projection display according to the present invention.

FIG. 6 illustrates the third preferred embodiment of a projection display according to the present invention. In this embodiment, the light beam 4 has an input axis that is parallel to the optical axis of the projection lens 40. As compared to the embodiment of FIG. 3, the position of the first reflective light valve 91 on the first polarization beam splitter prism 71, and the positions of the third light polarization selector 83 and the polarizer 52 relative to the third polarization beam splitter prism 73 are adjusted in order to enable the projection display of the present embodiment to process the three color components 41, 42, 43 of the light beam 4 accordingly.

Figure 7:
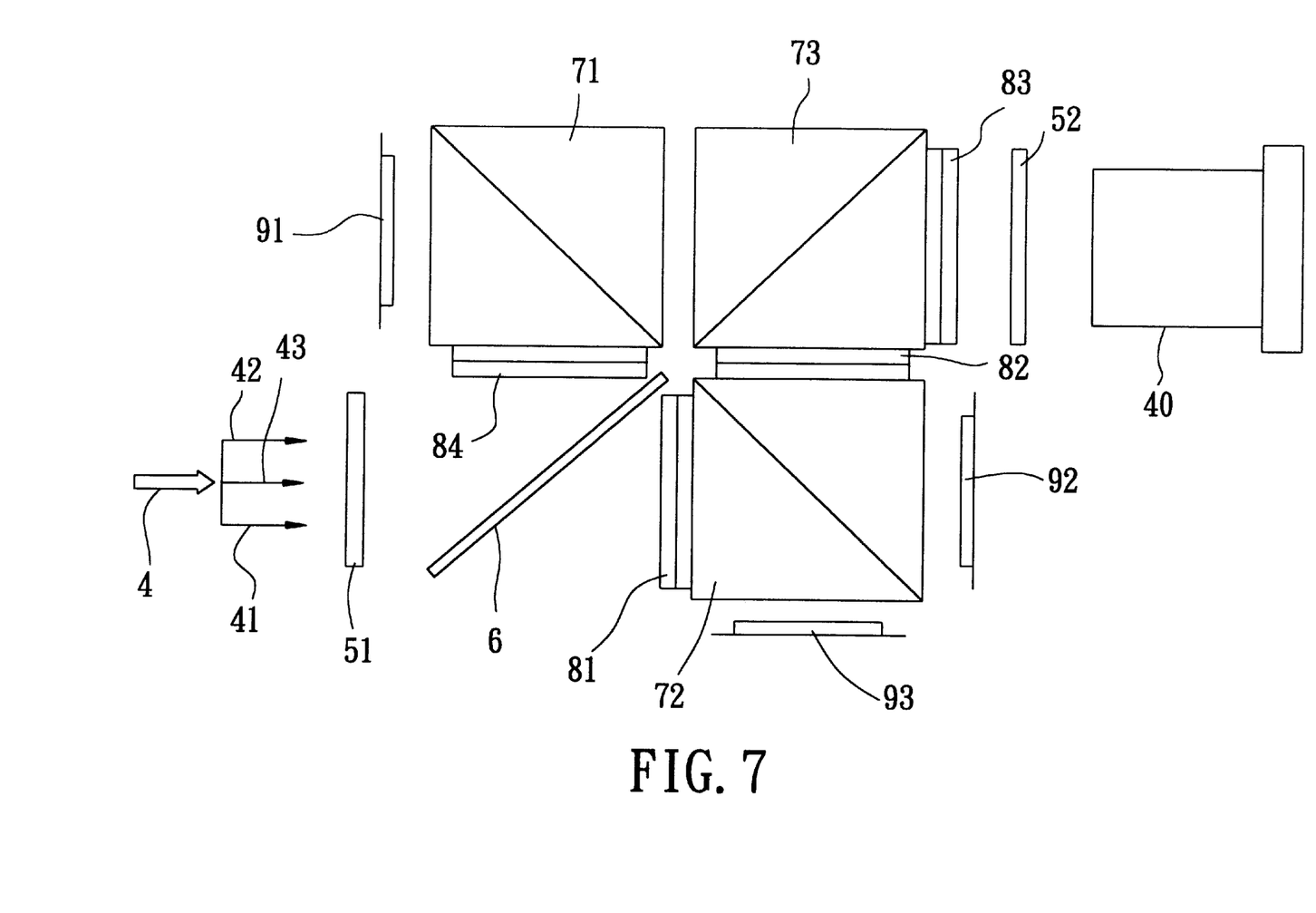
FIG. 7 is a schematic view of the fourth preferred embodiment of a projection display according to the present invention.

FIG. 7 illustrates the fourth preferred embodiment of a projection display according to the present invention. As compared to the embodiment of FIG. 6, the positions of the first and second polarization beam splitter prisms 71, 72 are interchanged, and the position of the first reflective light valve 91 on the first polarization beam splitter prism 71 and those of the second and third reflective light valves 92, 93 on the second polarization beam splitter prism 72 are adjusted as well so as to enable appropriate processing of the color components 41, 42, 43 of the light beam 4.

In the embodiments of FIGS. 6 and 7, the light polarization characteristics of the various light polarization selectors are selected to enable the projection display to process S-polarization or P-polarization light beam.

Figure 8:
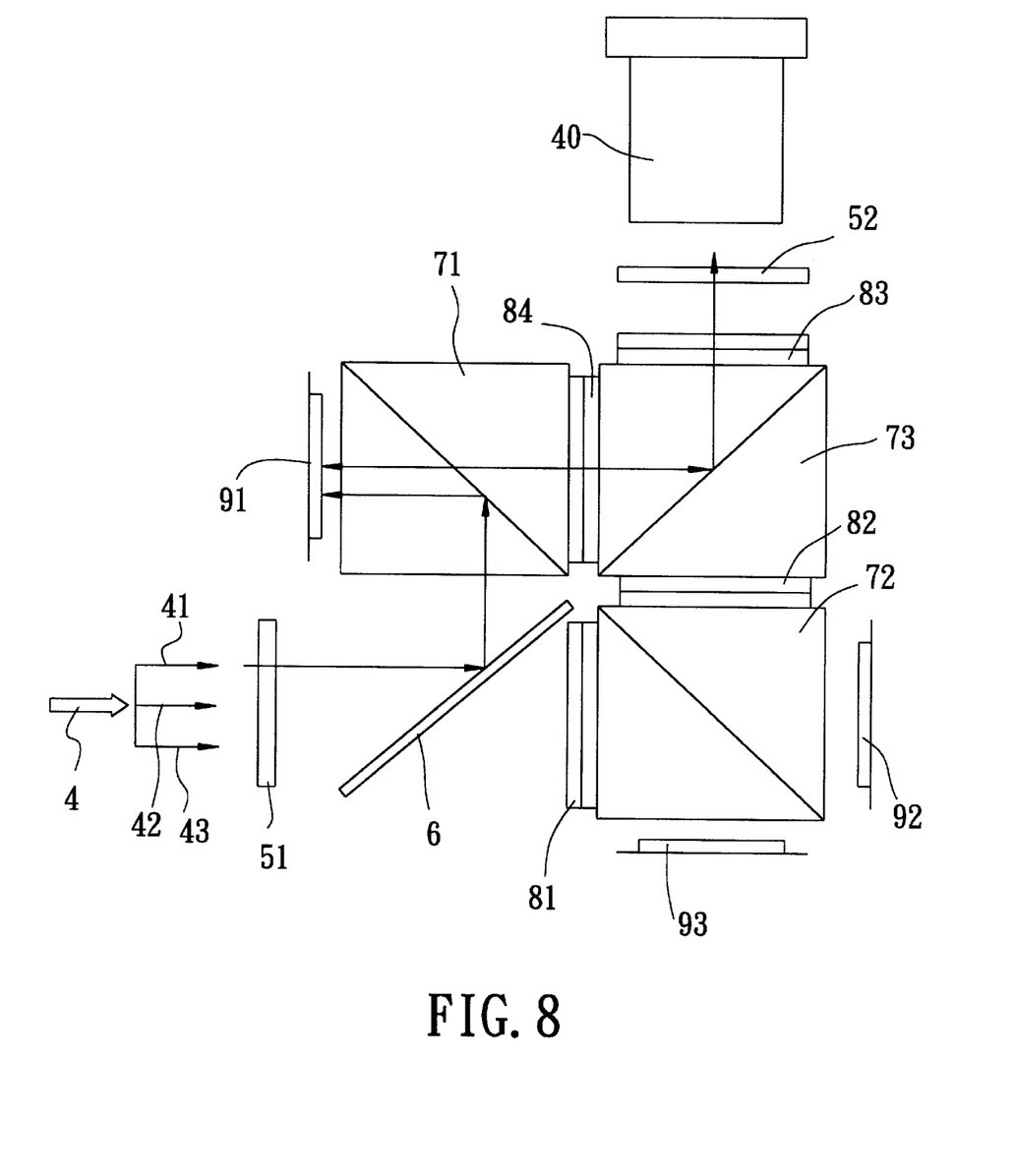
FIG. 8 is a schematic view of the fifth preferred embodiment of a projection display according to the present invention.

FIG. 8 illustrates the fifth preferred embodiment of a projection display according to the present invention. Unlike the embodiment of FIG. 5, the positions of the first reflective light valve 91 and the fourth light polarization selector 84 on the first polarization beam splitter prism 71 are adjusted. The second and third color components 42, 43 are processed in a manner similar to that described hereinbefore. However, in the present embodiment, when the S-polarization first color component 41 is reflected by the dichroic beam splitter 6 toward the first polarization beam splitter prism 71, the S-polarization first color component 41 will be reflected by the first polarization beam splitter prism 71 toward the first reflective light valve 91. When the first reflective light valve 91 is in the active (ON) state, the polarization state of the first color component 41 will be changed to P-polarization, and the P-polarization first color component 41 will be reflected back to the first polarization beam splitter prism 71. The P-polarization first color component 41 will be allowed to pass through the first polarization beam splitter prism 71 so as to reach the fourth light polarization selector 84. The first color component 41 will have the polarization state thereof changed to S-polarization as it passes through the fourth light polarization selector 84, and the third polarization beam splitter prism 73 will reflect the S-polarization first color component 41 to pass through the third light polarization selector 83 and the polarizer 52 so as to reach the projection lens 40.

Figure 9:
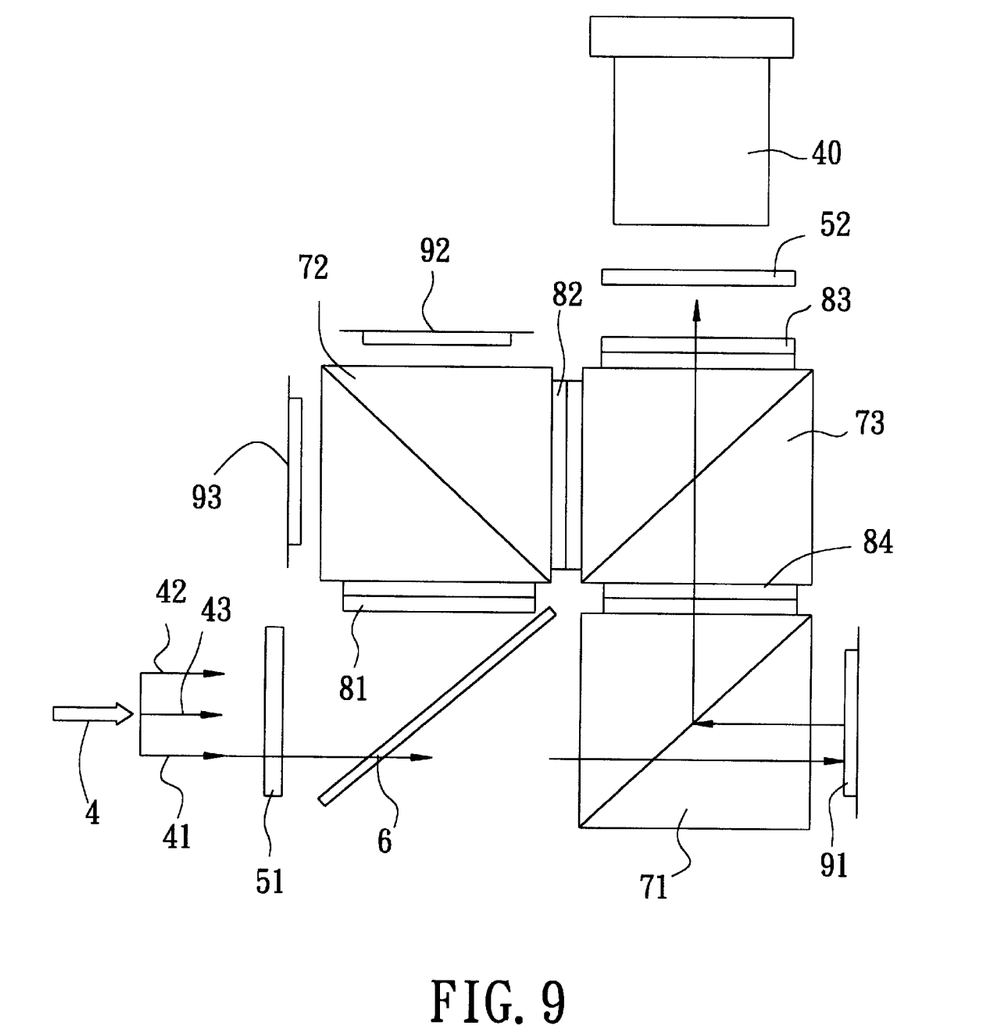
FIG. 9 is a schematic view of the sixth preferred embodiment of a projection display according to the present invention.

FIG. 9 illustrates the sixth preferred embodiment of a projection display according to the present invention. The projection display of this embodiment is capable of processing P-polarization light beam 4. As compared to the embodiment of FIG. 3, the positions of the first reflective light valve 91 and the fourth light polarization selector 84 on the first polarization beam splitter prism 71 are adjusted. Processing of the second and third color components 42, 43 proceeds in a manner similar to that described hereinabove. However, in this embodiment, when the P-polarization first color component 41 reaches the first reflective light valve 91 after passing through the dichroic beam splitter 6 and the first polarization beam splitter prism 71, the polarization state thereof will change from P-polarization to S-polarization in view of the active (ON) state of the first reflective light valve 91. The S-polarization first color component 41 will be reflected by the first reflective light valve 91 back to the first polarization beam splitter prism 71, and will be further reflected by the first polarization beam splitter prism 71 toward the fourth light polarization selector 84. The polarization state of the first color component 41 is changed to P-polarization as it passes through the fourth light polarization selector 84 prior to reaching the projection lens 40 via the third polarization beam splitter prism 73, the third light polarization selector 83 and the polarizer 52.

Figure 10:
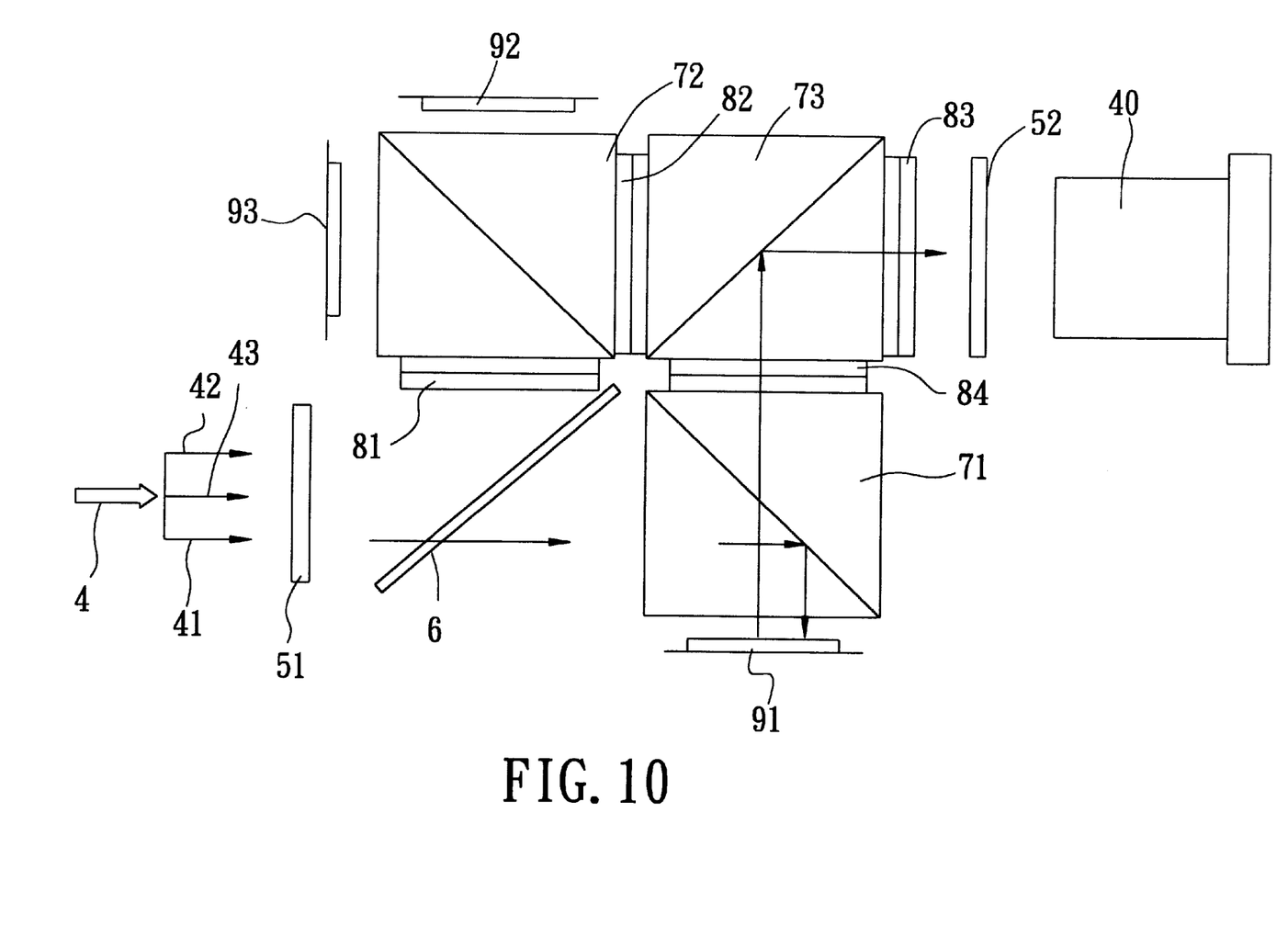
FIG. 10 is a schematic view of the seventh preferred embodiment of a projection display according to the present invention.

FIG. 10 illustrates the seventh preferred embodiment of a projection display according to the present invention. As compared to the embodiment of FIG. 6, the positions of the first reflective light valve 91 and the fourth light polarization selector 84 on the first polarization beam splitter prism 71 are adjusted. Processing of the second and third color components 42, 43 proceeds in a manner similar to that described hereinabove. However, in this embodiment, when the S-polarization first color component 41 reaches the first reflective light valve 91 after passing through the dichroic beam splitter 6 and being reflected by the first polarization beam splitter prism 71, the polarization state thereof will change to P-polarization in view of the active (ON) state of the first reflective light valve 91. The P-polarization first color component 41 will be reflected by the first reflective light valve 91 so as to pass through the first polarization beam splitter prism 71 and the fourth light polarization selector 84. The polarization state of the first color component 41 is changed from P-polarization back to S-polarization as it passes through the fourth light polarization selector 84. The S-polarization first color component 41 is then reflected by the third polarization beam splitter prism 73 so as to reach the projection lens 40 via the third light polarization selector 83 and the polarizer 52.

Figure 11:
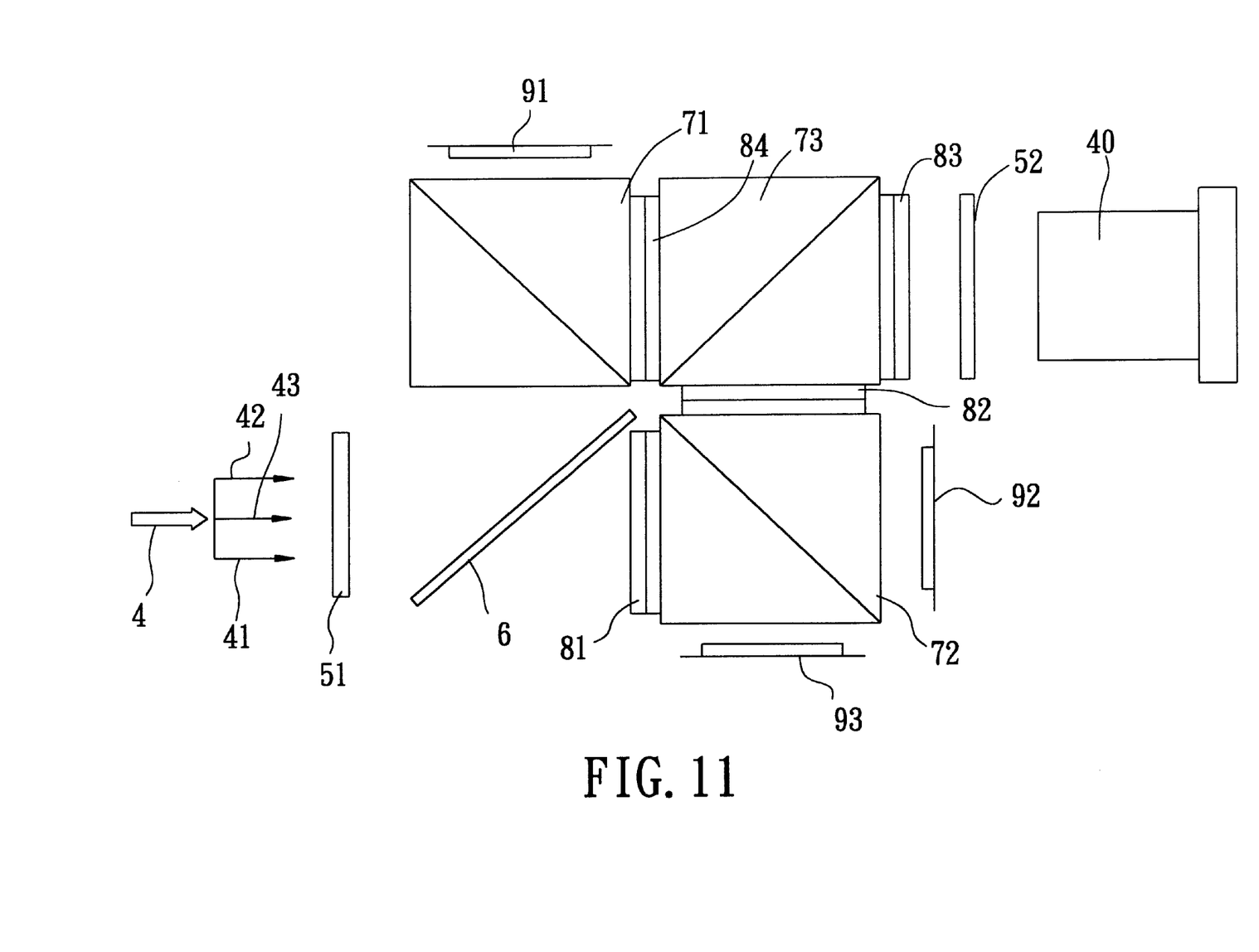
FIG. 11 is a schematic view of the eighth preferred embodiment of a projection display according to the present invention.

FIG. 11 illustrates the eighth preferred embodiment of a projection display according to the present invention. As compared to the embodiment of FIG. 7, the positions of the first reflective light valve 91 and the fourth light polarization selector 84 on the first polarization beam splitter prism 71 are adjusted so that the polarization state of the first color component 41 can be changed as the latter passes from the first polarization beam splitter prism 71 to the third polarization beam splitter prism 73.

It has thus been shown that, as compared to the aforesaid conventional projection display that utilizes four polarization beam splitter prisms, the projection display of this invention employs three polarization beam splitter prisms and a dichroic beam splitter to result in lower costs and in a compact and lighter construction while maintaining good image contrast quality.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A projection display for processing a light beam that is to be provided to a projection lens, the light beam including first, second and third color components, said projection display comprising:

a dichroic beam splitter adapted to separate the first color component from the second and third color components;

a first polarization beam splitter prism disposed adjacent to said dichroic beam splitter so as to receive the first color component therefrom;

a second polarization beam splitter prism disposed adjacent to said dichroic beam splitter so as to receive the second and third color components therefrom;

a third polarization beam splitter prism disposed adjacent to said first and second polarization beam splitter prisms;

a first reflective light valve disposed adjacent to said first polarization beam splitter prism so as to receive the first color component therefrom, said first reflective light valve processing the first color component from said first polarization beam splitter prism by changing polarization state of the first color component when in an active state, and reflecting the first color component back to said first polarization beam splitter prism, said first polarization beam splitter prism providing the first color component processed by said first reflective light valve to said third polarization beam splitter prism;

a first light polarization selector disposed between said dichroic beam splitter and said second polarization beam splitter prism for changing polarization state of one of the second and third color components so as to enable said second polarization beam splitter prism to separate the second color component from the third color component;

a second reflective light valve disposed adjacent to said second polarization beam splitter prism so as to receive the second color component therefrom, said second reflective light valve processing the second color component from said second polarization beam splitter prism by changing polarization state of the second color component when in an active state, and reflecting the second color component back to said second polarization beam splitter prism, said second polarization beam splitter prism providing the second color component processed by said second reflective light valve to said third polarization beam splitter prism;

a third reflective light valve disposed adjacent to said second polarization beam splitter prism so as to receive the third color component therefrom, said third reflective light valve processing the third color component from said second polarization beam splitter prism by changing polarization state of the third color component when in an active state, and reflecting the third color component back to said second polarization beam splitter prism, said second polarization beam splitter prism providing the third color component processed by said third reflective light valve to said third polarization beam splitter prism;

a second light polarization selector disposed between said second and third polarization beam splitter prisms for changing polarization state of one of the second and third color components that passes from said second polarization beam splitter prism to said third polarization beam splitter prism;

said third polarization beam splitter prism being further disposed so as to direct the first, second and third color components received from said first and second polarization beam splitter prisms to the projection lens; and a third light polarization selector to be disposed between said third polarization beam splitter prism and the projection lens, said third light polarization selector ensuring that the first, second and third color components from said third polarization beam splitter prism have the same polarization state prior to reaching the projection lens.

2. The projection display of claim 1, further comprising a fourth light polarization selector disposed between said dichroic beam splitter and said first polarization beam splitter prism.

3. The projection display of claim 1, further comprising a fourth light polarization selector disposed between said first and third polarization beam splitter prisms for changing the polarization state of the first color component that passes from said first polarization beam splitter prism to said third polarization beam splitter prism.

4. The projection display of claim 1, further comprising a polarizer disposed adjacent to an input side of said dichroic beam splitter.

5. The projection display of claim 1, further comprising a polarizer to be disposed between said third light polarization selector and the projection lens.

* * * * *